(12) United States Patent
Li et al.

(10) Patent No.: US 8,559,819 B2
(45) Date of Patent: Oct. 15, 2013

(54) INFORMATION TRANSFER AND RECEIVING METHOD, SYSTEM, AND DEVICE

(75) Inventors: Kun Li, Chengdu (CN); Jun Cai, Chengdu (CN); Jianlin Zhou, Shenzhen (CN); Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 13/096,769

(22) Filed: Apr. 28, 2011

(65) Prior Publication Data

US 2011/0200323 A1 Aug. 18, 2011

Related U.S. Application Data

(63) Continuation of application No. PCT/CN2009/074720, filed on Oct. 30, 2009.

(30) Foreign Application Priority Data

Oct. 31, 2008 (CN) .......................... 2008 1 0174682

(51) Int. Cl.
*H04B 10/00* (2013.01)
(52) U.S. Cl.
USPC ............................................................ 398/72
(58) Field of Classification Search
USPC ..................................................... 398/66–73
See application file for complete search history.

(56) References Cited

U.S. PATENT DOCUMENTS 6,498,667 B1 * 12/2002 Masucci et al. ................. 398/98
7,313,330 B2 * 12/2007 Kim et al. ....................... 398/72
7,385,995 B2 * 6/2008 Stiscia et al. ................... 370/412
7,408,955 B2 * 8/2008 Choi et al. ...................... 370/468
7,548,694 B2 * 6/2009 Kazawa et al. ................. 398/67

(Continued)

FOREIGN PATENT DOCUMENTS

CN 1649338 A 8/2005
CN 101030887 A 9/2007

(Continued)

OTHER PUBLICATIONS

Office Action issued in corresponding Chinese Patent Application No. 200810174682.2, mailed Jun. 29, 2011.

(Continued)

*Primary Examiner* — Agustin Bello
(74) *Attorney, Agent, or Firm* — Brinks Hofer Gilson & Lione

(57) ABSTRACT

The information transfer method includes: determining an indicator of a start bit in a protection time slot or a preamble time slot of a laser, and establishing a communication channel according to the indicator of the start bit; inserting Operation Administration and Maintenance (OAM) information of a Long Reach-Passive Optical Network (LR-PON) device into an upstream frame sent to an Optical Line Terminal (OLT) device by the LR-PON device at a position indicated by the indicator of the start bit, and transporting the upstream frame to the OLT device through the communication channel. Therefore, OAM functions of the LR-PON device are extended, so that the OAM information can be transported by the LR-PON device independently, and OAM characteristics of the LR-PON device are enhanced. For example, PON protection is better supported, and the speed and success ratio of protection switching of a PON system are increased.

20 Claims, 7 Drawing Sheets

(56) References Cited

U.S. PATENT DOCUMENTS

| | | | |
|---|---|---|---|
| 7,840,137 B2* | 11/2010 | Kazawa et al. | 398/72 |
| 7,949,255 B2* | 5/2011 | Zou | 398/58 |
| 7,991,296 B1* | 8/2011 | Johnston et al. | 398/154 |
| 8,090,261 B2* | 1/2012 | Sugawara et al. | 398/67 |
| 8,139,950 B2* | 3/2012 | Niibe et al. | 398/168 |
| 8,259,751 B2* | 9/2012 | Shi et al. | 370/468 |
| 2002/0057688 A1* | 5/2002 | Hamasaki et al. | 370/390 |
| 2003/0137975 A1* | 7/2003 | Song et al. | 370/353 |
| 2006/0147203 A1* | 7/2006 | Thinguldstad | 398/9 |
| 2008/0056719 A1 | 3/2008 | Bernard et al. | |
| 2008/0138084 A1* | 6/2008 | Youn et al. | 398/158 |
| 2008/0205443 A1* | 8/2008 | Shi et al. | 370/468 |
| 2008/0285972 A1* | 11/2008 | Takeuchi et al. | 398/60 |
| 2009/0169209 A1* | 7/2009 | Sugawara et al. | 398/75 |
| 2009/0202242 A1* | 8/2009 | Niibe et al. | 398/63 |
| 2009/0263132 A1* | 10/2009 | Rafel et al. | 398/66 |
| 2009/0274461 A1* | 11/2009 | Xu et al. | 398/66 |
| 2010/0040363 A1* | 2/2010 | Zhou et al. | 398/10 |
| 2010/0119228 A1 | 5/2010 | Zhou et al. | |
| 2011/0200323 A1* | 8/2011 | Li et al. | 398/9 |
| 2012/0121258 A1* | 5/2012 | Li et al. | 398/37 |

FOREIGN PATENT DOCUMENTS

| | | |
|---|---|---|
| CN | 101064719 A | 10/2007 |
| CN | 101119172 A | 2/2008 |
| CN | 101141228 A | 3/2008 |
| CN | 101146077 A | 3/2008 |
| CN | 101369846 A | 2/2009 |
| CN | 101399614 A | 4/2009 |
| CN | 101414932 A | 4/2009 |
| CN | 101729358 B | 4/2012 |
| EP | 2109252 A1 | 10/2009 |

OTHER PUBLICATIONS

Written Opinion of the International Searching Authority issued in corresponding PCT Patent Application No. PCT/CN2009/074720, mailed Feb. 4, 2010.

Extended European Search Report issued in corresponding European Patent Application No. 09823089.9, mailed Feb. 21, 2012.

Publication and International Search Report issued in corresponding PCT Patent Application No. PCT/CN2009/074720, mailed Feb. 4, 2010.

Singh, "GPON—The Next Generation Access Network" Transwitch Corp. Sep. 26, 2005.

International Telecommunication Union, "Gigabit-capable Passive Optical Networks (G-PON): Transmission Convergence Layer Specification" Series G: Transmission Systems and Media, Digital Systems and Networks—Digital Sections and Digital Line System—Optical Line Systems for Local and Access Networks. G984.3, Mar. 2008.

* cited by examiner

INFORMATION TRANSFER AND RECEIVING METHOD, SYSTEM, AND DEVICE

CROSS-REFERENCE TO RELATED APPLICATIONS

This application is a continuation of International Application No. PCT/CN2009/074720, filed on Oct. 30, 2009, which claims priority to Chinese Patent Application No. 200810174682.2, filed on Oct. 31, 2008, both of which are hereby incorporated by reference in their entireties.

FIELD OF THE INVENTION

The present invention relates to the field of network communication technologies, and in particular, to an information transfer and receiving method, system, and device.

BACKGROUND OF THE INVENTION

With the development of services such as video on demand, high definition TV, and network games, requirements of a subscriber on the bandwidth are ever increasing, and development of Fiber To The Home (FTTH) can effectively guarantee the access network bandwidth of "last mile". Among others, a Passive Optical Network (PON) technology is one of the most widely applied FTTH technologies currently.

In an existing PON system, for example, a Gigabit-PON (GPON), although the system has various monitoring and maintenance functions, and specifies alarm indications, performance events, and administration between Optical Line Terminals (OLTs) and an Optical Network Unit (ONU) in detail, the GPON is only applicable to a situation in which the OLTs and the ONU are directly interconnected by using optical signals in the conventional PON system. In an electrical relay Long Reach-PON (LR-PON) application, if necessary monitoring and processing are not performed in an electrical relay device, the previous alarm indications and maintenance functions can only be transparently transmitted, while the fault of an intermediate node cannot be analyzed and located. Therefore, Operation Administration and Maintenance (OAM) is required for the LR-PON device.

An existing method for transferring OAM information between the LR-PON device and the OLT device is as follows: In an upstream direction from the LR-PON device to the OLT device, a line rate is increased, and the OAM information between the LR-PON device and the OLT device is accommodated within the increased rate. Specifically, the method includes:

(1) a new upstream frame structure is defined, where in addition to accommodating the original PON data stream, the frame structure further needs to define a space for accommodating the OAM information;

(2) in a PON over Optical Transmission Network (OTN), a PON over Synchronous Digital Hierarchy (SDH)/Synchronous Optical Network (SONET), or a similar manner, the PON data stream is used as payload of the OTN, the SDH or the SONET, and is transferred through a transport network, and the OAM information of the LR-PON device is transferred through a communication channel formed by overhead bytes of the OTN, the SDH or the SONET.

However, the method requires a higher line rate and modification to the existing PON system, and is incompatible with the existing OLT device. Furthermore, the method requires support from transport networks used in pair back-to-back, and a transport network device near the OLT device is further required to establish a communication channel with the OLT device. Additionally, in the transport network device, format conversion from the OAM information of the LR-PON/OLT device to the transport network overhead is required. Therefore, the implementation of the method is complex, and the cost is high.

SUMMARY OF THE INVENTION

Embodiments of the present invention provide an information transfer and receiving method, system, and device, so as to transfer OAM information between an LR-PON device and an OLT device.

In one aspect, an information transfer method provided in an embodiment of the present invention includes:

determining an indicator of a start bit in a protection time slot or a preamble time slot of a laser, and establishing a communication channel according to the indicator of the start bit; and inserting OAM information of an LR-PON device into an upstream frame sent to an OLT device by the LR-PON device at a position indicated by the indicator of the start bit, and transporting the upstream frame to the OLT device through the communication channel.

In another aspect, an information receiving method provided in an embodiment of the present invention includes:

receiving an upstream frame from an LR-PON device; and determining an indicator of a start bit of a communication channel, and extracting OAM information from the upstream frame according to the indicator of the start bit.

In another aspect, an information transfer system provided in an embodiment of the present invention includes:

an LR-PON device, configured to determine an indicator of a start bit in a protection time slot or a preamble time slot of a laser, and establish a communication channel according to the indicator of the start bit; and insert OAM information of the LR-PON device into an upstream frame sent to an OLT device by the LR-PON device at a position indicated by the indicator of the start bit, and transport the upstream frame to the OLT device through the communication channel; and the OLT device, configured to receive the upstream frame from the LR-PON device, determine the indicator of the start bit of the communication channel, and extract the OAM information from the upstream frame according to the indicator of the start bit.

In another aspect, an LR-PON device provided in an embodiment of the present invention includes:

an establishment module, configured to determine an indicator of a start bit in a protection time slot or a preamble time slot of a laser, and establish a communication channel according to the indicator of the start bit; and a transport module, configured to insert OAM information of the LR-PON device into an upstream frame sent to an OLT device by the LR-PON device at a position indicated by the indicator of the start bit, and transport the upstream frame to the OLT device through the communication channel.

In another aspect, an OLT device provided in an embodiment of the present invention includes:

a receiving module, configured to receive an upstream frame from an LR-PON device; and an extraction module, configured to determine an indicator of a start bit of a communication channel, and extract OAM information from the upstream frame according to the indicator of the start bit.

Compared with the prior art, the embodiments of the present invention have the following advantages: According to the embodiments of the present invention, an LR-PON device establishes a communication channel in a protection time slot or a preamble time slot of a laser, and transports OAM information of the LR-PON device to an OLT device through the communication channel. Therefore, OAM functions of the LR-PON device are extended, so that the LR-PON device can transport the OAM information independently.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Embodiments of the present invention provide an information transfer method, system, and device, so that an LR-PON device establishes a communication channel without affecting an existing PON system, and OAM information is transferred between the LR-PON device and an OLT device.

Figure 1:
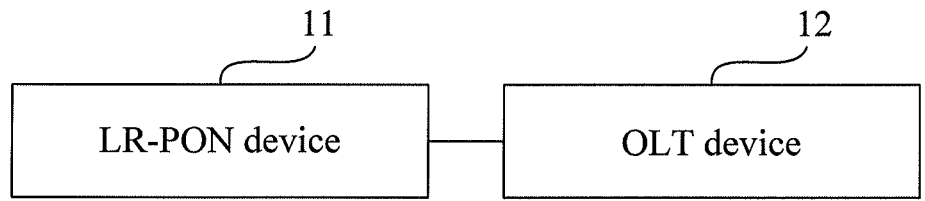
FIG. 1 is a structure diagram of an information transfer system according to a first embodiment of the present invention.

FIG. 1 is a structure diagram of an information transfer system according to a first embodiment of the present invention. As shown in FIG. 1, the information transfer system includes an LR-PON device 11 and an OLT device 12.

The LR-PON device 11 is configured to determine an indicator of a start bit in a protection time slot or a preamble time slot of a laser, and establish a communication channel according to the indicator of the start bit; and insert OAM information of the LR-PON device 11 into an upstream frame sent to the OLT device 12 by the LR-PON device 11 at a position indicated by the indicator of the start bit, and transport the upstream frame to the OLT device 12 through the communication channel.

The OLT device 12 is configured to receive the upstream frame from the LR-PON device 11, determine the indicator of the start bit of the communication channel, and extract the OAM information from the upstream frame according to the indicator of the start bit.

In the information transfer system, the LR-PON device 11 establishes the communication channel in the protection time slot or the preamble time slot of the laser, and transports the OAM information of the LR-PON device 11 to the OLT device 12 through the communication channel. Therefore, OAM functions of the LR-PON device 11 are extended, so that the LR-PON device 11 can transport the OAM information independently.

Figure 2:
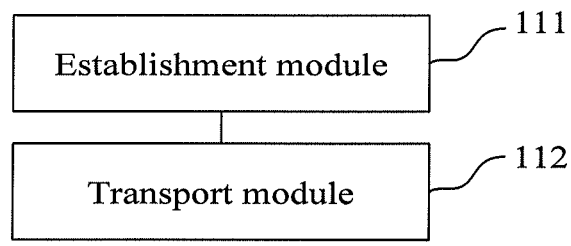
FIG. 2 is a structure diagram of an LR-PON device according to a second embodiment of the present invention.

FIG. 2 is a structure diagram of an LR-PON device according to a second embodiment of the present invention. As shown in FIG. 2, the LR-PON device includes an establishment module 111 and a transport module 112.

The establishment module 111 is configured to determine an indicator of a start bit in a protection time slot or a preamble time slot of a laser, and establish a communication channel according to the indicator of the start bit.

The transport module 112 is configured to insert OAM information of an LR-PON device 11 into an upstream frame sent to an OLT device 12 by the LR-PON device 11 at a position indicated by the indicator of the start bit, and transport the upstream frame to the OLT device 12 through the communication channel established by the establishment module 111.

Figure 3:
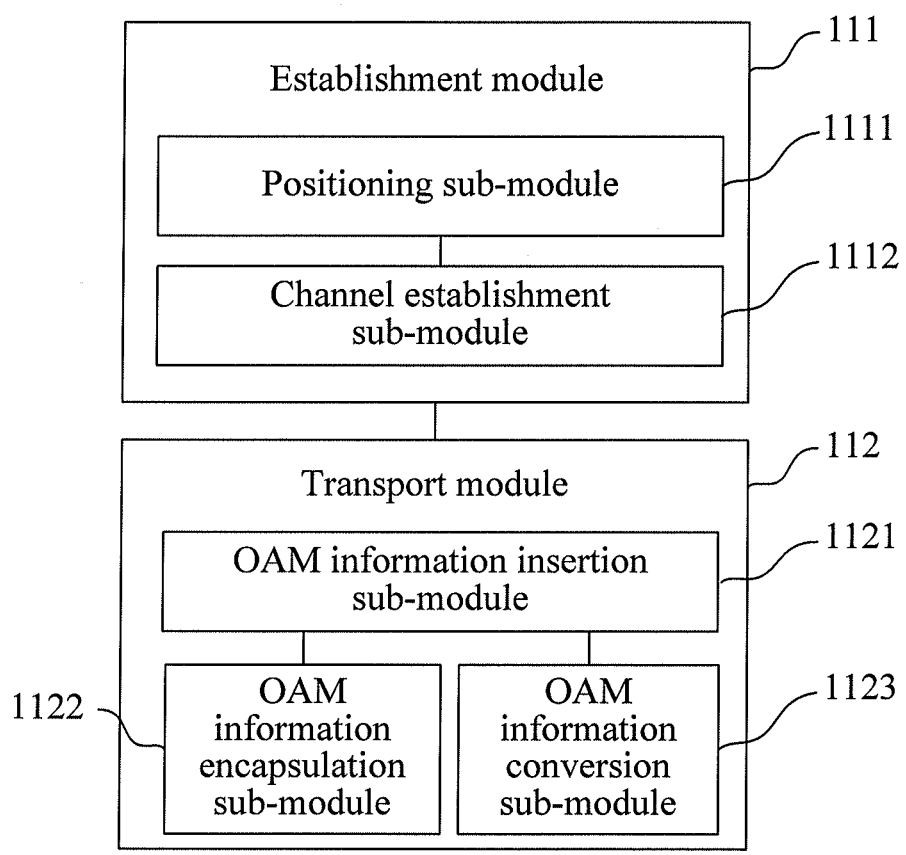
FIG. 3 is a structure diagram of an LR-PON device according to a third embodiment of the present invention.

In a third embodiment of the present invention, as shown in FIG. 3, the establishment module 111 includes a positioning sub-module 1111 and a channel establishment sub-module 1112.

The positioning sub-module 1111 is configured to search for a frame header of the upstream frame sent to the OLT device 12 by the LR-PON device 11, determine a position of a Delimiter field according to the frame header, determine a position of a last bit of the protection time slot or the preamble time slot of the laser according to the position of the Delimiter field, and forward shift a fixed number of bits with the position of the last bit of the protection time slot or the preamble time slot of the laser as a start point to determine the indicator of the start bit; or determine a position of a frame trailer of the upstream frame sent to the OLT device 12 by the LR-PON device 11 according to a position of a Delimiter field and a bandwidth map (BWmap), and backward shift a fixed number of bits with the position of the frame trailer of the upstream frame as a start point to determine the indicator of the start bit.

The channel establishment sub-module 1112 is configured to establish the communication channel according to the indicator of the start bit determined by the positioning sub-module 1111.

The transport module 112 includes an OAM information insertion sub-module 1121.

The OAM information insertion sub-module 1121 is configured to insert the OAM information into the upstream frame sent to the OLT device 12 by the LR-PON device 11 at the position indicated by the indicator of the start bit determined by the positioning sub-module 1111, and transport the OAM information to the OLT device 12 through the communication channel. Specifically, the OAM information insertion sub-module 1121 inserts the OAM information into a Tg position or a preamble position of the upstream frame, and transports a normal PON upstream data stream in a time slot not transmitting the OAM information.

The transport module 112 further includes an OAM information encapsulation sub-module 1122.

The OAM information encapsulation sub-module 1122 is configured to encapsulate the OAM information of the LR-PON device 11, and the OAM information insertion sub-module 1121 is further configured to insert the OAM information encapsulated by the OAM information encapsulation sub-module 1122 into the upstream frame sent to the OLT device 12 by the LR-PON device 11.

The transport module 112 further includes an OAM information conversion sub-module 1123.

The OAM information insertion sub-module 1123 is configured to convert different types of the OAM information of the LR-PON device into a bit or a bit combination corresponding to the different types of the OAM information, and the OAM information insertion sub-module 1121 is further configured to insert the bit or the bit combination converted by the OAM information conversion sub-module 1123 into the upstream frame sent to the OLT device 12 by the LR-PON device 11.

Figure 4:
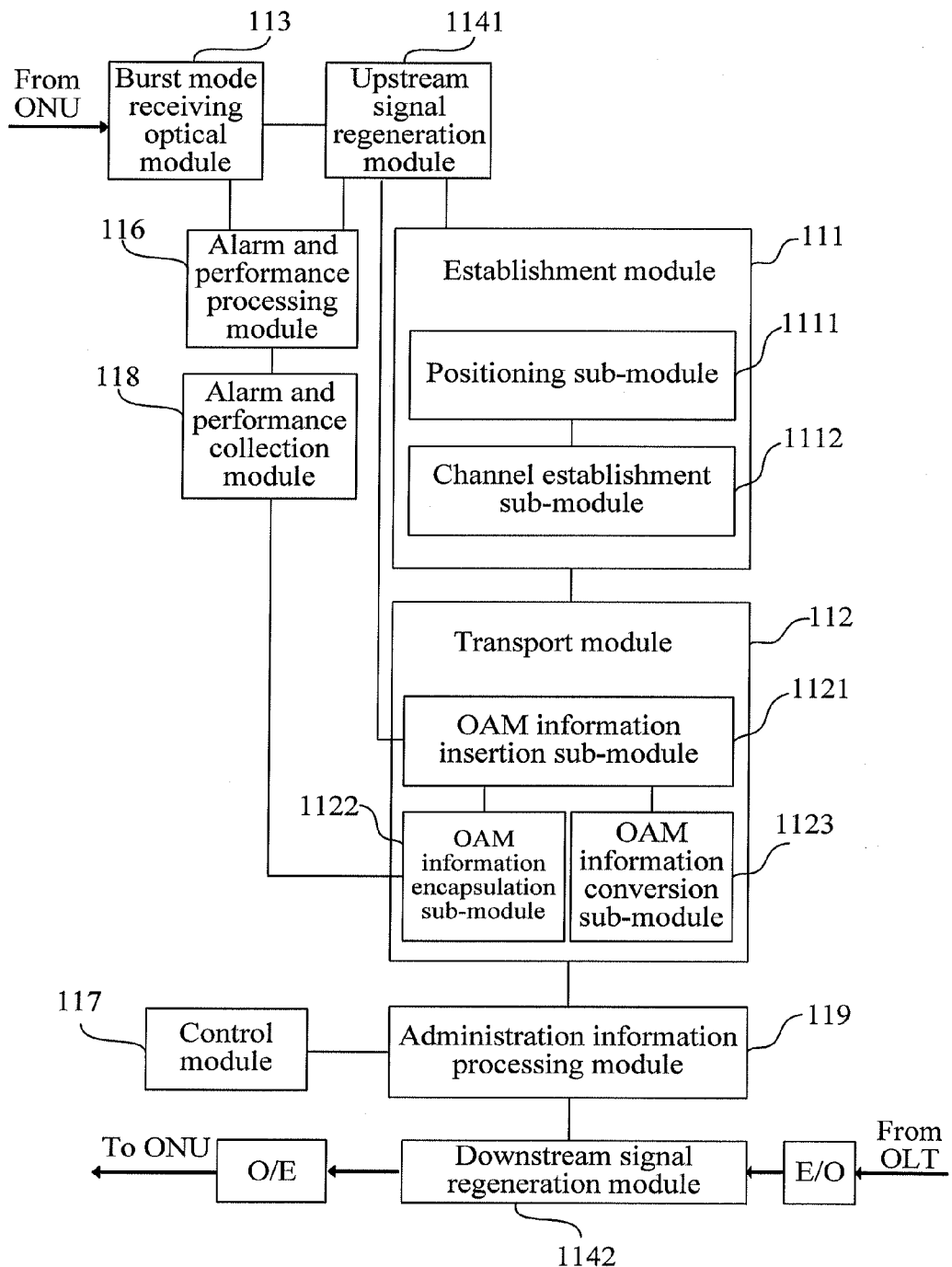
FIG. 4 is a structure diagram of an LR-PON device according to a fourth embodiment of the present invention.

In a fourth embodiment of the present invention, as shown in FIG. 4, the LR-PON device 11 may further include a burst mode receiving optical module 113 and a signal regeneration module 114.

The burst mode receiving optical module 113 is configured to receive an optical signal from an optical fiber, and convert the optical signal into an electrical signal.

The signal regeneration module 114 is configured to compensate a preamble of an upstream PON signal lost on the burst mode receiving optical module 111.

The LR-PON device 11 may further include an alarm and performance processing module 116 and a control module 117. In FIG. 4, the signal regeneration module 114 may specifically include an upstream signal regeneration module 1141 and a downstream signal regeneration module 1142.

The alarm and performance processing module 116 is configured to generate or collect alarm and performance data of the LR-PON device 11.

The control module 117 is configured to control and administrate the LR-PON device 11.

The LR-PON device 11 may further include an alarm and performance collection module 118 and an administration information processing module 119.

The alarm and performance collection module 118 is configured to collect the OAM information of the LR-PON device 11, and acquire the alarm and performance data to be transported to the OLT device 12 from the alarm and performance processing module 116 of the LR-PON device 11.

The administration information processing module 119 is configured to process OAM administration information, which includes: acquiring the administration information for the LR-PON device 11 from the OLT device 12, and sending the administration information to the control module 117 of the LR-PON device 11; and collecting administration information to be reported to the OLT device 12.

In the LR-PON device, the establishment module 111 establishes the communication channel in the protection time slot or the preamble time slot of the laser, and the transport module 112 transports the OAM information of the LR-PON device 11 to the OLT device 12 through the communication channel established by the establishment module 111. Therefore, OAM functions of the LR-PON device 11 are extended, so that the LR-PON device 11 can transport the OAM information independently.

Figure 5:
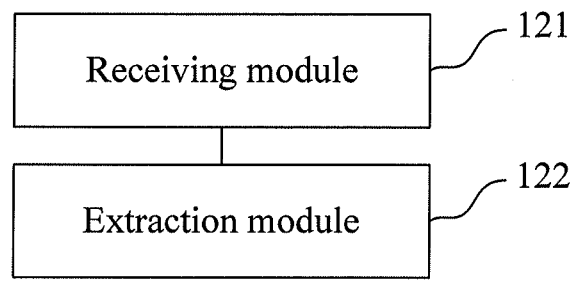
FIG. 5 is a structure diagram of an OLT device according to a fifth embodiment of the present invention.

FIG. 5 is a structure diagram of an OLT device according to a fifth embodiment of the present invention. As shown in FIG. 5, the OLT device includes a receiving module 121 and an extraction module 122.

The receiving module 121 is configured to receive an upstream frame from an LR-PON device 11.

The extraction module 122 is configured to determine an indicator of a start bit of the communication channel, and extract OAM information from the upstream frame according to the indicator of the start bit.

Figure 6:
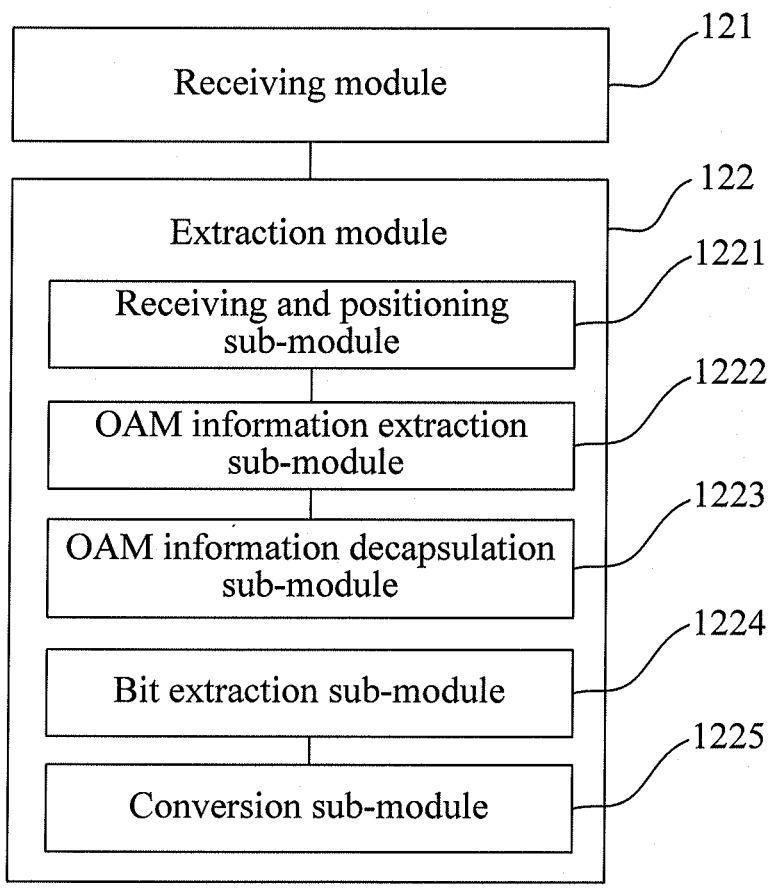
FIG. 6 is a structure diagram of an OLT device according to a sixth embodiment of the present invention.

In a sixth embodiment of the present invention, as shown in FIG. 6, the extraction module 122 includes a receiving and positioning sub-module 1221 and an OAM information extraction sub-module 1222.

The receiving and positioning sub-module 1221 is configured to search for a frame header of the upstream frame sent to the OLT device 12 by the LR-PON device 11, determine a position of a Delimiter field according to the frame header, determine a position of a last bit of the protection time slot or the preamble time slot of the laser according to the position of the Delimiter field, forward shift a fixed number of bits with a position of the last bit of the protection time slot or the preamble time slot of the laser as a start point to determine the indicator of the start bit of the communication channel; or determine a position of a frame trailer of the upstream frame sent to the OLT device 12 by the LR-PON device 11 according to the position of the Delimiter field and a BWmap, and backward shift a fixed number of bits with the position of the frame trailer of the upstream frame as a start point to determine the indicator of the start bit of the communication channel.

The OAM information extraction sub-module 1222 is configured to extract the OAM information from the upstream frame received by the receiving module 121 according to the indicator of the start bit determined by the receiving and positioning sub-module 1221.

The extraction module 122 further includes an OAM information decapsulation sub-module 1223.

The OAM information decapsulation sub-module 1223 is configured to decapsulate the OAM information extracted by the OAM information extraction sub-module 1222, and acquire the original OAM information sent by the LR-PON device 11.

The extraction module 122 further includes a bit extraction sub-module 1224 and a conversion sub-module 1225.

The bit extraction sub-module 1224 is configured to extract a bit or a bit combination sent by the LR-PON device 11 from the upstream frame received by the receiving module 121 according to the indicator of the start bit determined by the receiving and positioning sub-module 1221.

The conversion sub-module 1225 is configured to convert the bit or the bit combination extracted by the bit extraction sub-module 1224 into different types of the OAM information according to a predetermined corresponding relationship.

Figure 7:
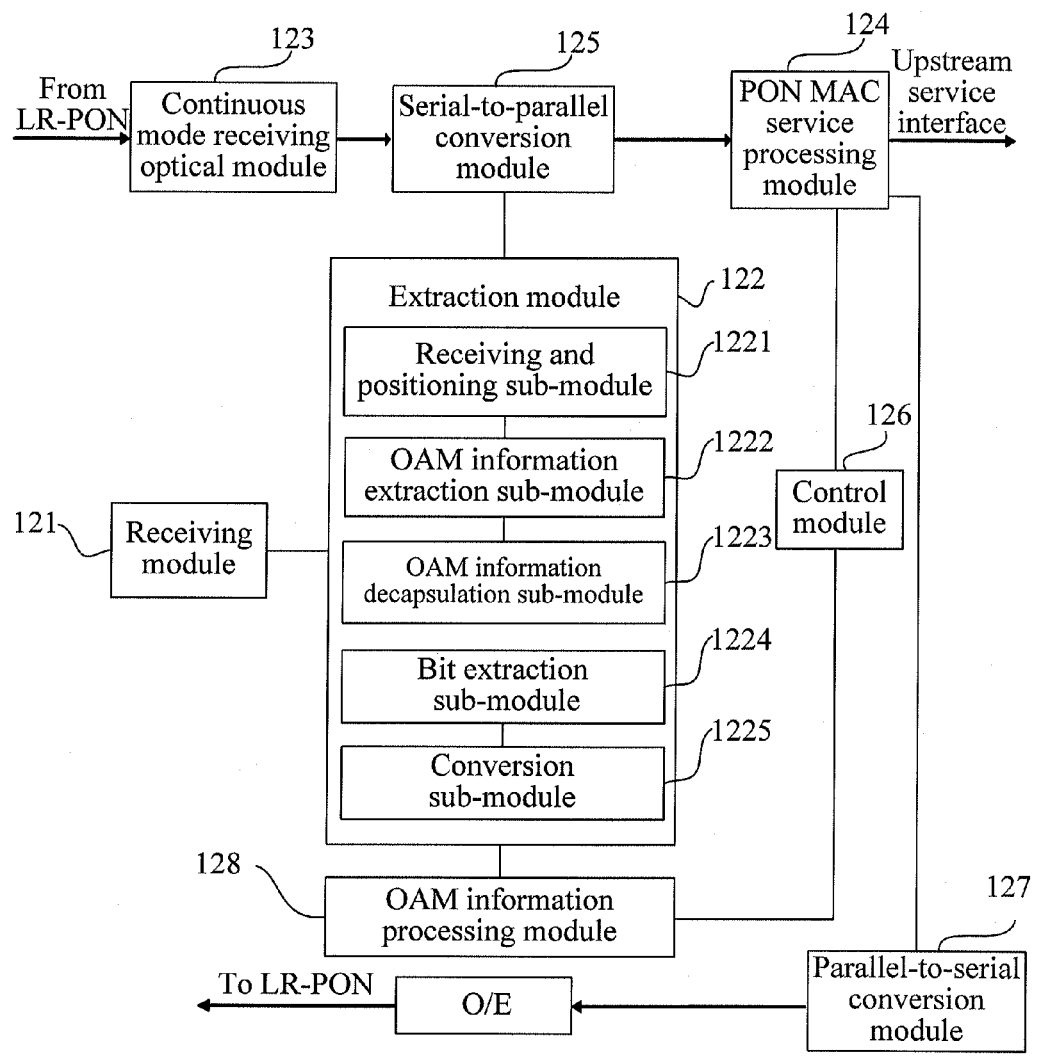
FIG. 7 is a structure diagram of an OLT device according to a seventh embodiment of the present invention.

In a seventh embodiment of the present invention, as shown in FIG. 7, the OLT device 12 may further include a continuous mode receiving optical module 123 and a PON Media Access Control (MAC) service processing module 124.

The continuous mode receiving optical module 123 is configured to receive an optical signal from an optical fiber, and convert the optical signal into an electrical signal.

The PON MAC service processing module 124 is configured to process a PON service.

The OLT device 12 may further include a serial-to-parallel conversion module 125, a control module 126, a parallel-to-serial conversion module 127, and an OAM information processing module 128.

The serial-to-parallel conversion module 125 is configured to convert high-speed serial data received by the continuous mode receiving optical module 123 into relative low-speed parallel data to facilitate chip processing.

The control module 126 is a main control module of the OLT device 12, and is configured to administrate the OLT device 12.

The parallel-to-serial conversion module 127 is configured to convert a parallel signal output by the PON MAC service processing module 124 into a serial signal.

The OAM information processing module 128 is configured to send the OAM information acquired by the OAM information decapsulation sub-module 1233 and the conversion sub-module 1225 to the control module 126 of the OLT device 12 for subsequent processing.

In the OLT device, the receiving module 121 receives a data stream from the LR-PON device 11, and the extraction module 122 extracts the OAM information from the data stream received by the receiving module 121, so that the OLT device exchanges the OAM information with the LR-PON device 11.

Information is transferred from the OLT device 12 to the LR-PON device 11 in the form of continuous data streams in a broadcast manner, and no additional bandwidth is available to accommodate the OAM information particularly for the LR-PON device 11. In order not to change the existing PON system, existing technologies are adopted to transfer the OAM information in a downstream direction. For example, a Physical Layer OAM (PLOAM) message or an ONT Management and Control Interface (OMCI) message is adopted to carry the OAM information. The LR-PON device 11 extracts the OAM information sent to the LR-PON device 11 by the OLT device 12 from the downstream signal regeneration module 1142, and finally sends the OAM information to the control module 117 of the LR-PON device 11 for processing.

Figure 8:
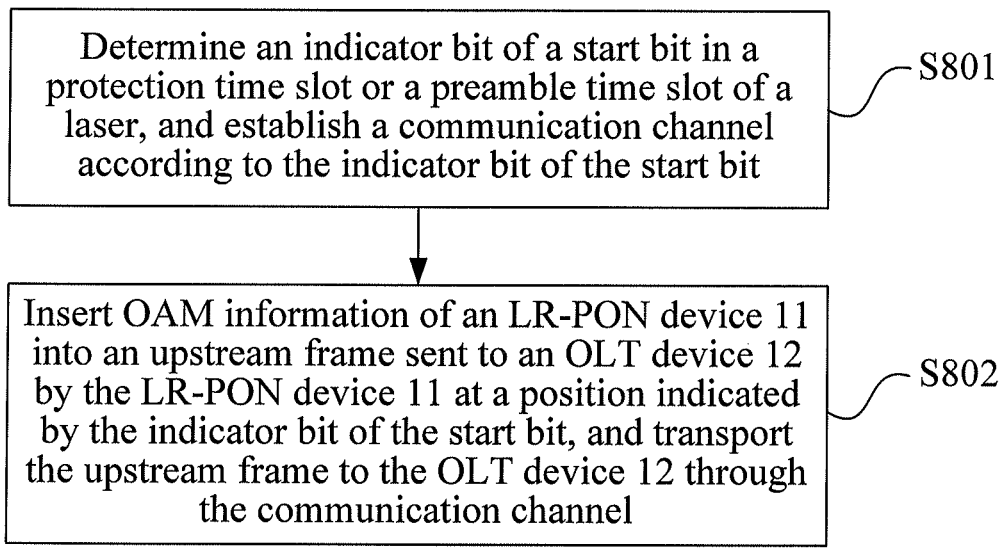
FIG. 8 is a flow chart of a method in which an LR-PON device sends OAM information according to an eighth embodiment of the present invention.

FIG. 8 is a flow chart of a method in which an LR-PON device transfers OAM information according to an eighth embodiment of the present invention. As shown in FIG. 8, the method includes the following steps:

Step S801: Determine an indicator of a start bit in a protection time slot or a preamble time slot of a laser, and establish a communication channel according to the indicator of the start bit.

The determining the indicator of the start bit in the protection time slot or the preamble time slot of the laser includes the following steps:

Search for a frame header of the upstream frame sent to an OLT device 12 by an LR-PON device 11, and determine a position of a Delimiter field according to the frame header; determine a position of a last bit of the protection time slot or the preamble time slot of the laser according to the position of the Delimiter field; and forward shift a fixed number of bits with the position of the last bit of the protection time slot or the preamble time slot of the laser as a start point to determine the indicator of the start bit; or Determine a position of a frame trailer of the upstream frame sent to the OLT device 12 by the LR-PON device 11 according to a position of a Delimiter field and a BWmap; and backward shift a fixed number of bits with the position of the frame trailer of the upstream frame as a start point to determine the indicator of the start bit.

Step S802: Insert OAM information of an LR-PON device 11 into an upstream frame sent to an OLT device 12 by the LR-PON device 11 at a position indicated by the indicator of the start bit, and transport the upstream frame to the OLT device 12 through the communication channel.

When the indicator of the start bit determined by the LR-PON device 11 is valid, the OAM information is inserted into the upstream frame sent to the OLT device 12 by the LR-PON device 11 at the position indicated by the indicator of the start bit, and the upstream frame is transported to the OLT device 12 through the communication channel.

When the OAM information of the LR-PON device 11 is inserted into the upstream frame, the LR-PON device 11 can encapsulate the OAM information of the LR-PON device 11, and insert the encapsulated OAM information into the upstream frame sent to the OLT device 12 by the LR-PON device 11.

The LR-PON device 11 may further convert different types of the OAM information of the LR-PON device into a bit or a bit combination corresponding to the different types of the OAM information, and insert the bit or the bit combination into the upstream frame sent to the OLT device 12 by the LR-PON device 11.

In the embodiment of the present invention, the LR-PON device 11 establishes the communication channel in the protection time slot or the preamble time slot of the laser, and transports the OAM information of the LR-PON device 11 to the OLT device 12 through the communication channel. Therefore, OAM functions of the LR-PON device 11 are extended, so that the LR-PON device 11 can transport the OAM information independently.

Figure 9:
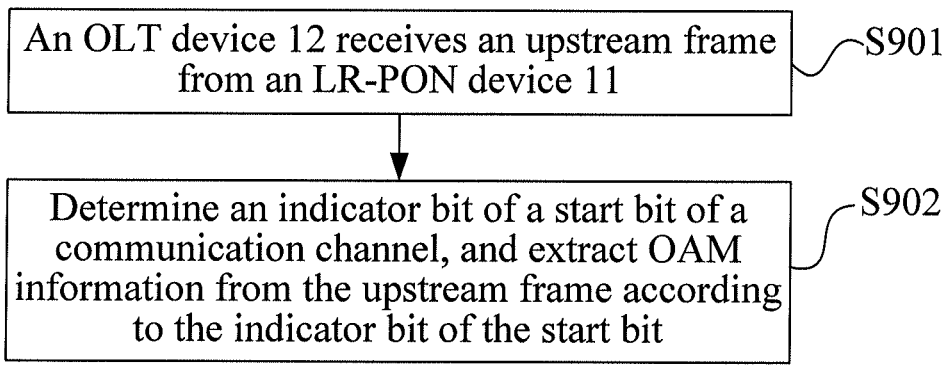
FIG. 9 is a flow chart of a method in which an OLT device receives OAM information according to a ninth embodiment of the present invention.

FIG. 9 is a flow chart of a method in which an OLT device receives OAM information according to a ninth embodiment of the present invention. As shown in FIG. 9, the method includes the following steps:

Step S901: An OLT device 12 receives an upstream frame from an LR-PON device 11.

Step S902: Determine an indicator of a start bit of a communication channel, and extract OAM information from the upstream frame according to the indicator of the start bit.

The determining the indicator of the start bit of the communication channel may specifically include the following steps:

Search for a frame header of the upstream frame sent to an OLT device 12 by an LR-PON device, determine a position of a Delimiter field according to the frame header, determine a position of a last bit of a protection time slot or a preamble time slot of the laser according to the position of the Delimiter field, and forward shift a fixed number of bits with the position of the last bit of the protection time slot or the preamble time slot of the laser as a start point to determine the indicator of the start bit of the communication channel; or determine a position of a frame trailer of the upstream frame sent to the OLT device 12 by the LR-PON device 11 according to a position of a Delimiter field and a BWmap, and backward shift a fixed number of bits with the position of the frame trailer of the upstream frame as a start point to determine the indicator of the start bit of the communication channel.

Furthermore, after the extracting the OAM information from the upstream frame according to the indicator of the start bit, the OLT device 12 decapsulates the extracted OAM information to acquire the original OAM information sent by the LR-PON device 11.

Alternatively, the OLT device 12 extracts a bit or a bit combination sent by the LR-PON device 11 from the upstream frame of the LR-PON device 11, and converts the bit or the bit combination into different types of the OAM information according to a predetermined corresponding relationship.

In the embodiment of the present invention, the OLT device 12 receives a data stream from the LR-PON device 11, and extracts the OAM information from the received data stream, so as to exchange the OAM information with the LR-PON device 11.

A specific procedure in which an LR-PON device 11 and an OLT device 12 transfer OAM information in a 2.5 G GPON system is described in the following with specific embodiments. A single-fiber bidirectional optical fiber or a two-fiber bidirectional optical fiber may be provided between the LR-PON device 11 and the OLT device 12, and specific working procedures for the two fibers are the same.

In the embodiment of the present invention, a communication channel for transferring the OAM information is established. When the communication channel is established, a position of the OAM communication channel is determined at first. When a line rate is 1.25 Gbit/s, the smallest protection time slot of the laser is 32 bits. In this embodiment, a position from bit 1 to bit 8 is selected to establish an 8-bit wide communication channel for transferring the OAM information.

The 8 bits can provide a bandwidth of 64 Kbit/s because a GPON frame frequency is 8 KHz/s.

Next, an LR-PON device 11 sending a piece of alarm information is taken as an example to describe a procedure in which the LR-PON device 11 sends the OAM information.

Figure 10:
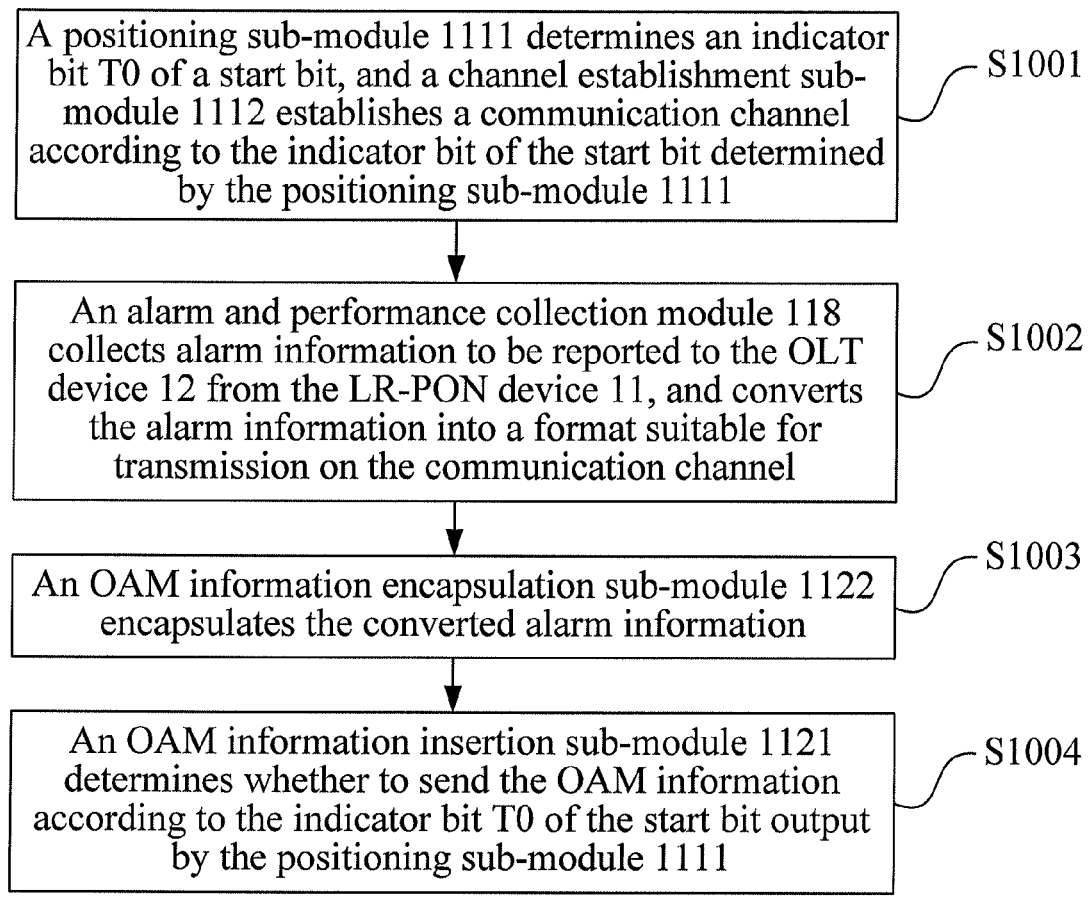
FIG. 10 is a flow chart of a method in which an LR-PON device sends OAM information according to a tenth embodiment of the present invention.

FIG. 10 is a flow chart of a method in which an LR-PON device sends OAM information according to a tenth embodiment of the present invention. As shown in FIG. 10, the method includes the following steps.

Step S1001: A positioning sub-module 1111 determines an indicator T0 of a start bit, and a channel establishment sub-module 1112 establishes a communication channel according to the indicator of the start bit determined by the positioning sub-module 1111.

The determining, by the positioning sub-module 1111, the indicator T0 of the start bit may specifically include the following steps: Determine a position of a Delimiter field by searching for an upstream frame header, use a position 44 bits before the Delimiter field as a position of a last bit of a protection time slot Tg of a laser, and then forward shift 8 bits to determine the indicator T0 of the start bit in this embodiment.

When searching for the upstream frame header, the positioning sub-module 1111 searches for a data string 0xB5983 of 20 bits in an upstream data stream by bits, and the specific method is the same as the method used by the existing OLT device.

In another embodiment of the present invention, the positioning sub-module 1111 of the LR-PON device 11 extracts a BWmap from a downstream frame sent by the OLT device 12, and after a position of a Delimiter field is determined in the upstream frame, a length of a corresponding BWmap is increased to determine a position of a frame trailer of the upstream frame. A start position of a protection time slot Tg of a laser can be determined according to the position of the frame trailer of the upstream frame, that is, the indicator T0 of the start bit in this embodiment.

Step S1002: An alarm and performance collection module 118 collects alarm information to be reported to the OLT device 12 from the LR-PON device 11, and converts the alarm information into a format suitable for transmission on the communication channel.

Step S1003: An OAM information encapsulation sub-module 1122 encapsulates the converted alarm information to be adaptable to transmission on a specific physical transmission channel. For example, the alarm information is encapsulated in a Point to Point Protocol (PPP), High level Data Link Control (HDLC), Link Access Procedure-SDH (LAPS), Generic Framing Procedure (GFP), Generic Mapping Procedure (GMP) or customized format, so as to determine starting/ending positions of the alarm information and an adaptive channel rate.

Step S1004: An OAM information insertion sub-module 1121 determines whether to send the OAM information according to the indicator T0 of the start bit output by the positioning sub-module 1111. When T0 is valid, the OAM information insertion sub-module 1121 continuously sends the 8-bit OAM information. In other time slots, the LR-PON device 11 sends normal service data, that is, upstream frames sent to the OLT device 12 by an ONU through the LR-PON device 11.

According to the embodiment of the present invention, without affecting the existing PON system and increasing the line rate of the PON, the OAM functions of the LR-PON device 11 are extended, so that the LR-PON device 11 can transport the OAM information independently. Therefore, the embodiment better supports, for example, PON protection, increases the speed and the success ratio of protection switching of a PON system, and improves the link fault positioning capability of the PON system.

Figure 11:
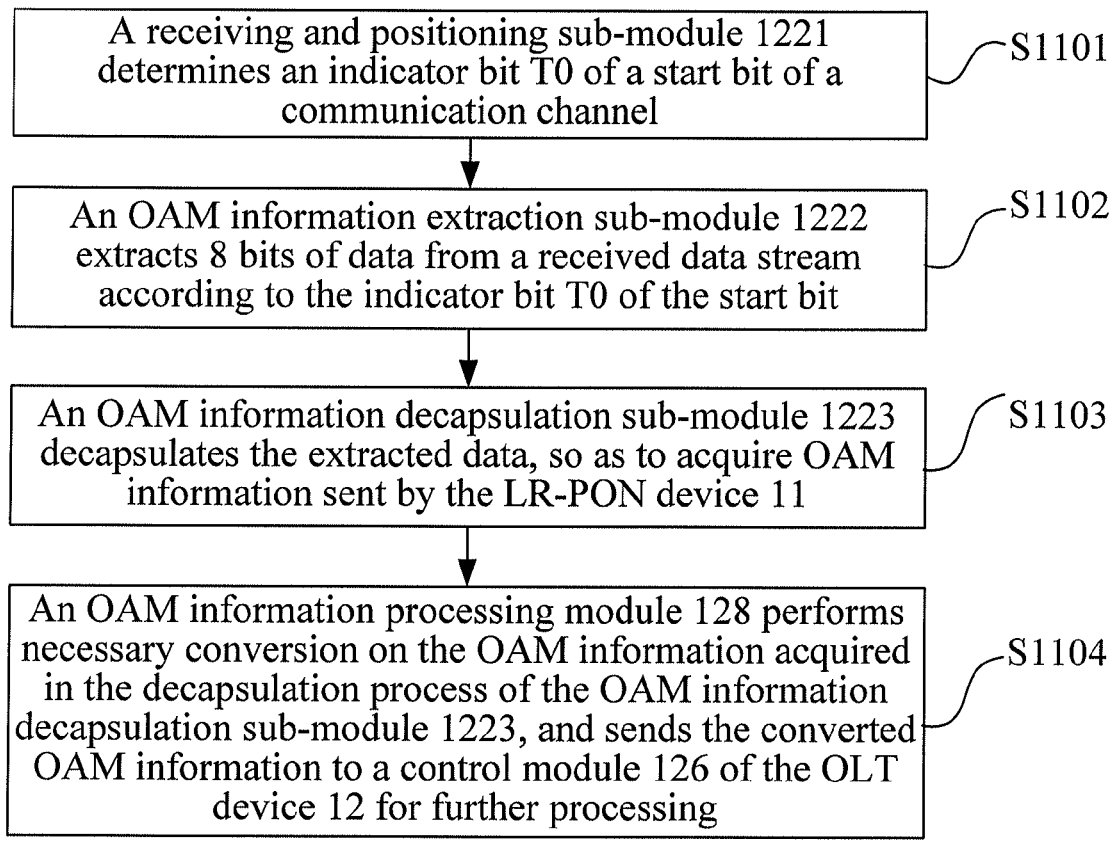
FIG. 11 is a flow chart in which an OLT device receives OAM information according to an eleventh embodiment of the present invention.

FIG. 11 is a flow chart in which an OLT device receives OAM information according to an eleventh embodiment of the present invention. As shown in FIG. 11, the flow chart includes the following steps.

Step S1101: A receiving and positioning sub-module 1221 determines an indicator T0 of a start bit of a communication channel. The adopted method is the same as the method adopted when the LR-PON device 11 determines the indicator T0 of the start bit.

In an OLT device 12, a PON MAC service processing module 124 sends BWmap information to the receiving and positioning sub-module 1221.

Step S1102: An OAM information extraction sub-module 1222 extracts 8 bits of data from a received data stream according to the indicator T0 of the start bit.

Step S1103: An OAM information decapsulation sub-module 1223 decapsulates the extracted data in a PPP, HDLC, LAPS, GFP, GMP or customized manner, so as to acquire OAM information sent by the LR-PON device 11.

Step S1104: An OAM information processing module 128 performs necessary conversion on the OAM information acquired in the decapsulation process of the OAM information decapsulation sub-module 1223, and sends the converted OAM information to a control module 126 of the OLT device 12 for further processing.

In the embodiment of the present invention, the OLT device 12 determines the indicator T0 of the start bit of the communication channel, and extracts the OAM information from the received data stream according to the indicator T0 of the start bit, so as to exchange the OAM information with the LR-PON device 11.

When types of information to be transmitted are less, the LR-PON device 11 may also adopt a relatively simple method to transmit the OAM information. Differences from the foregoing method lie in that, in Step S1003, the OAM information encapsulation sub-module 1144 converts different types of the OAM information into a bit or a bit combination corresponding to the different types of the OAM information. When a type of OAM information is valid, correspondingly bit=1 is output or a valid bit combination corresponding to the type of the OAM information is output; when a type of OAM information is ineffective, correspondingly bit=0 is output or an invalid bit combination corresponding to the type of the OAM information is output. In this way, encapsulation operations may be simplified, so as to reduce the design and cost of the LR-PON device 11. When the relatively simple method is adopted, for a GPON system, because Tg at least has 32 bits, if 1 bit corresponds to a type of OAM information, Tg can correspond to 32 different types of the OAM information; if a bit combination manner is adopted, Tg can correspond to more information types.

In this case, in the procedure that the OLT device 12 receives the OAM information, step S1103 needs to be modified as follows: The OAM information decapsulation submodule 1233 converts the bit or the bit combination sent by the LR-PON device 11 into different types of the OAM information according to the predetermined corresponding relationship.

Because an Ethernet PON (EPON) system does not have a fixed frame frequency, a communication channel having a constant rate cannot be established in the EPON system as the GPON system. However, a protection time slot of a laser of the EPON is longer. In a 1 GE EPON system, Tg is 512 ns, at most 640 bits of data can be transported for once. Information longer than this length can also be transported in a divided manner for multiple times with reference to the embodiment in the GPON system, and is reassembled by the OLT device 12 to acquire complete OAM information. In the EPON system, the working procedures of the LR-PON device 11 and the OLT device 12 are similar to the working procedures in the GPON system, and only some adaptation modifications are required according to characteristics of the EPON system. For example, a method for positioning the protection time slot of the laser in the EPON system is implemented by searching for a Preamble field in an EPON upstream frame.

According to the embodiment of the present invention, without affecting the existing PON system and increasing the line rate of the PON, the OAM functions of the LR-PON device 11 are extended, so that the LR-PON device 11 can transport the OAM information independently. Therefore, the embodiment better supports PON protection, increases the speed and the success ratio of protection switching of a PON system, and improves the link fault positioning capability of the PON system. Furthermore, the method according to the embodiment of the present invention does not affect such functions as preamble and positioning of an existing PON frame, is downward compatible with an existing PON device. Therefore, the embodiment protects the investment of users, and provides the possibility of future upgrade. The present invention enhances the OAM functions of the LR-PON device, and reduces the maintenance and use cost of the LR-PON device.

Through the descriptions of the preceding embodiments, those skilled in the art may understand that the present invention may be implemented by using hardware only or by using software and a necessary universal hardware platform. Based on such understandings, the technical solutions of the present invention may be embodied in the form of a software product. The software product may be stored in a nonvolatile storage medium, which may be a Compact Disk Read-Only Memory (CD-ROM), a Universal Serial Bus (USB) flash drive, or a removable hard drive. The software product includes a number of instructions that enable a computer device (a personal computer, server, or network device) to execute the methods provided in the embodiments of the present invention.

It is understandable to those skilled in the art that the accompanying drawings are for illustrating the exemplary embodiments only, and the modules or processes in the accompanying drawings are not mandatory.

In addition, the modules in the apparatus in the embodiments of the present invention may be distributed in a way described herein, or distributed in other ways, for example, in one or more other apparatuses. The modules may be combined into one module, or split into multiple submodules.

The serial number of the embodiments given above is for clear description only, and does not imply the order of preference.

The above descriptions are merely specific embodiments of the present invention, but not intended to limit the present invention. Any variation that can be easily thought of by persons skilled in the art should fall in the scope of the present invention.

What is claimed is:

1. An information transfer method, comprising:
   determining, by a Long Reach-Passive Optical Network (LR-PON) device, an indicator of a start bit in a guard time slot or a preamble time slot assigned for a laser of an Optical Network Unit (ONU), and establishing a communication channel in the guard time slot or the preamble time slot assigned for the laser of the ONU according to the indicator of the start bit; and
   inserting, by the LR-PON device, Operation Administration and Maintenance (OAM) information of the LR-PON device into an upstream frame sent to an Optical Line Terminal (OLT) device by the LR-PON device at a position indicated by the indicator of the start bit, and transporting the upstream frame to the OLT device through the communication channel.

2. The method according to claim 1, wherein the determining, by the LR-PON device, the indicator of the start bit in the guard time slot or the preamble time slot assigned for the laser of the ONU comprises:
   searching for a frame header of the upstream frame sent to the OLT device by the LR-PON device, and determining a position of a Delimiter field according to the frame header;
   determining a position of a last bit of the guard time slot or the preamble time slot assigned for the laser of the ONU according to the position of the Delimiter field; and
   forward shifting a fixed number of bits with the position of the last bit of the guard time slot or the preamble time slot assigned for the laser of the ONU as a start point to determine the indicator of the start bit.

3. The method according to claim 1, wherein the determining, by the LR-PON device, the indicator of the start bit in the guard time slot or the preamble time slot assigned for the laser of the ONU comprises:
   determining a position of a frame trailer of the upstream frame sent to the OLT device by the LR-PON device according to a position of a Delimiter field and a bandwidth map (BWmap); and
   backward shifting a fixed number of bits with the position of the frame trailer of the upstream frame as a start point to determine the indicator of the start bit.

4. The method according to claim 1, wherein the inserting, by the LR-PON device, the OAM information of the LR-PON device into the upstream frame sent to the OLT device by the LR-PON device comprises:
   encapsulating the OAM information of the LR-PON device, and inserting the encapsulated OAM information into the upstream frame sent to the OLT device by the LR-PON device.

5. The method according to claim 1, wherein the inserting, by the LR-PON device, the OAM information of the LR-PON device into the upstream frame sent to the OLT device by the LR-PON device comprises:

converting different types of the OAM information of the LR-PON device into a bit or a bit combination corresponding to the different types of the OAM information, and inserting the bit or the bit combination into the upstream frame sent to the OLT device by the LR-PON device.

6. An information receiving method, comprising:
receiving, by an Optical Line Terminal (OLT), an upstream frame from a Long Reach-Passive Optical Network (LR-PON) device; and
determining, by the OLT, an indicator of a start bit of a communication channel, and extracting Operation Administration and Maintenance (OAM) information from the upstream frame according to the indicator of the start bit, wherein the communication channel is in a guard time slot or a preamble time slot assigned for an laser of an Optical Network Unit (ONU), and the start bit is in the guard time slot or the preamble slot assigned for the laser of the ONU.

7. The method according to claim 6, wherein the determining, by the OLT, the indicator of the start bit of the communication channel comprises:
searching for a frame header of the upstream frame sent to an Optical Line Terminal OLT device by the LR-PON device, and determining a position of a Delimiter field according to the frame header; determining a position of a last bit of the protection time slot or the preamble time slot of the laser according to the position of the Delimiter field; forward shifting a fixed number of bits with the position of the last bit of the guard time slot or the preamble time slot assigned for the laser of the ONU as a start point to determine the indicator of the start bit of the communication channel.

8. The method according to claim 6, wherein the determining, by the OLT, the indicator of the start bit of the communication channel comprises:
determining a position of a frame trailer of the upstream frame sent to the OLT device by the LR-PON device according to a position of a Delimiter field and a bandwidth map (BWmap); and backward shifting a fixed number of bits with the position of the frame trailer of the upstream frame as a start point to determine the indicator of the start bit of the communication channel.

9. The method according to claim 6, wherein after the extracting the OAM information from the upstream frame according to the indicator of the start bit, the method further comprises:
decapsulating, by the OLT, the extracted OAM information, and acquiring the original OAM information sent by the LR-PON device.

10. The method according to claim 6, wherein the extracting the OAM information from the upstream frame comprises:
extracting a bit or a bit combination sent by the LR-PON device from the upstream frame; and
converting the bit or the bit combination into different types of the OAM information according to a predetermined corresponding relationship.

11. An information transfer system, comprising:
a Long Reach-Passive Optical Network (LR-PON) device, configured to determine an indicator of a start bit in a time slot or a preamble time slot of assigned for a laser of an Optical Network Unit (ONU), and establish a communication channel in the guard time slot or the preamble time slot assigned for the laser of the ONU according to the indicator of the start bit; and insert Operation Administration and Maintenance (OAM) information of the LR-PON device into an upstream frame sent to an Optical Line Terminal (OLT) device by the LR-PON device at a position indicated by the indicator of the start bit, and transport the upstream frame to the OLT device through the communication channel; and
the OLT device, configured to receive the upstream frame from the LR-PON device, determine the indicator of the start bit of the communication channel, and extract the OAM information from the upstream frame according to the indicator of the start bit.

12. A Long Reach-Passive Optical Network (LR-PON) device, comprising:
an establishment module, configured to determine an indicator of a start bit in a guard time slot or a preamble time slot assigned for a laser of an Optical Network Unit (ONU), and establish a communication channel in the guard time slot or the preamble time slot assigned for the laser of the ONU according to the indicator of the start bit; and
a transport module, configured to insert Operation Administration and Maintenance (OAM) information of the LR-PON device into an upstream frame sent to an Optical Line Terminal (OLT) device by the LR-PON device at a position indicated by the indicator of the start bit, and transport the upstream frame to the OLT device through the communication channel established by the establishment module.

13. The device according to claim 12, wherein the establishment module comprises:
a positioning sub-module, configured to search for a frame header of the upstream frame sent to the OLT device by the LR-PON device, determine a position of a Delimiter field according to the frame header, determine a position of a last bit of the guard time slot or the preamble time slot assigned for the laser of the ONU according to the position of the Delimiter field, and forward shift a fixed number of bits with a position of the last bit of the guard time slot or the preamble time slot assigned for the laser of the ONU as a start point to determine the indicator of the start bit; or determine a position of a frame trailer of the upstream frame sent to the OLT device by the LR-PON device according to a position of a Delimiter field and a bandwidth map (BWmap), and backward shift a fixed number of bits with the position of the frame trailer of the upstream frame as a start point to determine the indicator of the start bit; and
a channel establishment sub-module, configured to establish the communication channel according to the indicator of the start bit determined by the positioning sub-module.

14. The device according to claim 13, wherein the transport module comprises:
an OAM information insertion sub-module, configured to insert the OAM information into the upstream frame sent to the OLT device by the LR-PON device at the position indicated by the indicator of the start bit determined by the positioning sub-module, and transport the OAM information to the OLT device through the communication channel.

15. The device according to claim 14, wherein the transport module further comprises:
an OAM information encapsulation sub-module, configured to encapsulate the OAM information of the LR-PON device, wherein the OAM information insertion sub-module is further configured to insert the OAM information encapsulated by the OAM information encapsulation sub-module into the upstream frame sent to the OLT device by the LR-PON device.

16. The device according to claim 14, wherein the transport module further comprises:

an OAM information conversion sub-module, configured to convert different types of the OAM information of the LR-PON device into a bit or a bit combination corresponding to the different types of the OAM information, wherein the OAM information insertion sub-module is further configured to insert the bit or the bit combination converted by the OAM information conversion sub-module into the upstream frame sent to the OLT device by the LR-PON device.

17. An Optical Line Terminal (OLT) device, comprising:

a receiving module, configured to receive an upstream frame from a Long Reach-Passive Optical Network (LR-PON) device; and an extraction module, configured to determine an indicator of a start bit of a communication channel, and extract Operation Administration and Maintenance (OAM) information from the upstream frame according to the indicator of the start bit, wherein the communication channel is in a guard time slot or a preamble time slot assigned for an laser of an Optical Network Unit (ONU), the start bit is in the guard time slot or the preamble slot assigned for a laser of an ONU.

18. The OLT device according to claim 17, wherein the extraction module comprises:

a receiving and positioning sub-module, configured to search for a frame header of the upstream frame sent to the OLT device by the LR-PON device, determine a position of a Delimiter field according to the frame header, determine a position of a last bit of the guard time slot or the preamble time slot assigned for the laser of the ONU according to the position of the Delimiter field, and forward shift a fixed number of bits with a position of the last bit of the guard time slot or the preamble time slot assigned for the laser of the ONU as a start point to determine the indicator of the start bit of the communication channel; or determine a position of a frame trailer of the upstream frame sent to the OLT device by the LR-PON device according to a position of a Delimiter field and a bandwidth map (BWmap), and backward shift a fixed number of bits with the position of the frame trailer of the upstream frame as a start point to determine the indicator of the start bit of the communication channel; and an OAM information extraction sub-module, configured to extract the OAM information from the upstream frame received by the receiving module according to the indicator of the start bit determined by the receiving and positioning sub-module.

19. The OLT device according to claim 18, wherein the extraction module further comprises:

an OAM information decapsulation sub-module, configured to decapsulate the OAM information extracted by the OAM information extraction sub-module, and acquire the original OAM information sent by the LR-PON device.

20. The OLT device according to claim 18, wherein the extraction module further comprises:

a bit extraction sub-module, configured to extract a bit or a bit combination sent by the LR-PON device from the upstream frame received by the receiving module according to the indicator of the start bit determined by the receiving and positioning sub-module; and a conversion sub-module, configured to convert the bit or the bit combination extracted by the bit extraction sub-module into different types of the OAM information according to a predetermined corresponding relationship.

* * * * *

UNITED STATES PATENT AND TRADEMARK OFFICE
CERTIFICATE OF CORRECTION

PATENT NO. : 8,559,819 B2  Page 1 of 1
APPLICATION NO. : 13/096769
DATED : October 15, 2013
INVENTOR(S) : Kun Li et al.

It is certified that error appears in the above-identified patent and that said Letters Patent is hereby corrected as shown below:

In the Claims

In column 13, claim 11, line 62, before "time slot or a preamble" insert --guard--.

Signed and Sealed this
Thirty-first Day of December, 2013

Margaret A. Focarino
*Commissioner for Patents of the United States Patent and Trademark Office*